United States Patent
Kim et al.

(10) Patent No.: US 11,516,041 B2
(45) Date of Patent: *Nov. 29, 2022

(54) METHOD AND DEVICE FOR EVENT NOTIFICATION IN HOME NETWORK SYSTEM

(71) Applicant: Samsung Electronics Co., Ltd., Suwon-si (KR)

(72) Inventors: Se-Hoon Kim, Seoul (KR); Jun-Hyung Kim, Yongin-si (KR); Dong-Keon Kong, Suwon-si (KR); Jai-Ick Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,410

(22) Filed: Jul. 1, 2020

(65) Prior Publication Data

US 2020/0336330 A1 Oct. 22, 2020

Related U.S. Application Data

(63) Continuation of application No. 15/105,323, filed as application No. PCT/KR2014/012584 on Dec. 19, 2014, now Pat. No. 10,721,090.

(30) Foreign Application Priority Data

Dec. 20, 2013 (KR) .................. 10-2013-0160535

(51) Int. Cl.
*H04L 12/28* (2006.01)
*H04W 4/70* (2018.01)
(Continued)

(52) U.S. Cl.
CPC .......... *H04L 12/2823* (2013.01); *H04L 51/18* (2013.01); *H04L 67/55* (2022.05); *H04W 4/70* (2018.02)

(58) Field of Classification Search
CPC ..... H04L 12/2823; H04L 67/26; H04L 51/18; H04W 4/20; H04W 68/00
See application file for complete search history.

(56) References Cited

U.S. PATENT DOCUMENTS 8,073,921 B2 12/2011 Thomas et al.
2005/0159823 A1* 7/2005 Hayes ................. H04L 12/2803
700/19

(Continued)

FOREIGN PATENT DOCUMENTS

CN 101218790 A 7/2008
CN 102497397 A 6/2012
(Continued)

OTHER PUBLICATIONS

Google Cloud Messaging, https://web.archive.org/web/20131019153501/http://developer.android.com/google/gcm/gcm.html, Oct. 19, 2013.

(Continued)

*Primary Examiner* — Younes Naji
(74) *Attorney, Agent, or Firm* — Jefferson IP Law, LLP

(57) ABSTRACT

The present invention separately includes a push server which enables a notification message regarding occurrence of an event to be received even though a smart home application is turned off in a mobile terminal. The present invention receives a notification message using the push server, and resource information corresponding to an event of a home device is included in the notification message which is transmitted from the push server to the mobile terminal.

15 Claims, 7 Drawing Sheets

(51) Int. Cl.
*H04L 51/18* (2022.01)
*H04L 67/55* (2022.01)

(56) References Cited

U.S. PATENT DOCUMENTS

| | | |
|---|---|---|
| 2008/0209034 A1 | 8/2008 | Shin et al. |
| 2009/0204681 A1 | 8/2009 | Sun |
| 2011/0106279 A1 | 5/2011 | Cho et al. |
| 2011/0111777 A1 | 5/2011 | Wakasa et al. |
| 2011/0195695 A1 | 8/2011 | Gupta et al. |
| 2011/0285852 A1 | 11/2011 | Thomas et al. |
| 2012/0290740 A1* | 11/2012 | Tewari ............ G06F 16/27 709/248 |
| 2013/0073635 A1 | 3/2013 | Cao |
| 2013/0121252 A1 | 5/2013 | Peng et al. |
| 2013/0305305 A1 | 11/2013 | Park et al. |
| 2013/0311611 A1 | 11/2013 | Shim et al. |
| 2014/0081433 A1* | 3/2014 | Cheong ............ H04L 67/56 700/90 |
| 2014/0091923 A1* | 4/2014 | Heninwolf ............ H04L 51/52 340/539.11 |
| 2016/0011918 A1 | 1/2016 | Hwang |
| 2017/0005825 A1 | 1/2017 | Kim et al. |
| 2019/0320442 A1* | 10/2019 | Thies ............ H04L 67/55 |

FOREIGN PATENT DOCUMENTS

| | | | |
|---|---|---|---|
| CN | 102938787 A | 2/2013 | |
| CN | 103023681 A | 4/2013 | |
| CN | 103685458 A | 3/2014 | |
| CN | 105814917 B | 6/2020 | |
| EP | 2 666 257 A2 | 11/2013 | |
| EP | 2 713 641 A | 4/2014 | |
| KR | 10-2005-0082498 A | 8/2005 | |
| KR | 10-2011-0047764 A | 5/2011 | |
| KR | 10-2012-0060570 A | 6/2012 | |
| KR | 10-2013-0050202 A | 5/2013 | |
| KR | 10-1271769 B1 | 6/2013 | |
| KR | 10-2013-0080583 A | 7/2013 | |
| WO | 2006/004466 A1 | 1/2006 | |
| WO | 2012/099425 A2 | 7/2012 | |
| WO | 2012-099428 A2 | 7/2012 | |
| WO | 2012/099428 A3 | 7/2012 | |
| WO | 2013/015655 A2 | 1/2013 | |
| WO | 2013/097452 A1 | 7/2013 | |
| WO | 2015/010645 A1 | 1/2015 | |
| WO | WO-2015010645 A1 * | 1/2015 | ........... H04L 51/046 |

OTHER PUBLICATIONS

Implementing GCM Server, https://web.archive.org/web/20130908094257/http://developer.android.com/google/gcm/server.html, Sep. 8, 2013.
Chang et al. Moblie Monitoring and Control Framework With Active Push and Plug and Play Capacities, Emerald Group Publishing Limited [ISSN 0141-5151], Sep. 23, 2013.
Counterpart European Office Action dated Apr. 1, 2021, issued in European Patent Application No. 14872219.2.
Extended European Search Report dated Oct. 21, 2020, issued in European Patent Application No. 20176827.2.
Chinese Office Action dated Jun. 30, 2021, issued in Chinese Patent Application No. 202010459699.3.
Home Automation, Wikipedia, Nov. 29, 2013 https://en.wikipedia.org/w/index.php?title=Home_automation&oldid=583775754.
Internet of Things, Wikipedia, Dec. 17, 2013 https://en.wikipedia.org/w/inde. php title=Internet_of_things&direction=prev&oldid=586556365.
Internet Archive Miele@Home Info Service, https://web.archive.org/web/20130505042652/http://www.miele.de/de/haushalt/produkte/44669_ 44673.htm#p44671, May 5, 2013.
Market Share of Android and IOS in November, Marktnnteil• von Android und iOS an, Smartphone-Absatz in Oeuts<:hland bis Dez. 2021, Nov. 2013.
European Office Action dated Mar. 22, 2022, issued in European Patent Application No. 14 872 219.2.

* cited by examiner

```
<Notification Message>
POST /notifications HTTP/1.1
Host: {IPv4Address}
X-API-Version: v1.5.0
Content-Type: applciation/json
Content-Length: {contentLength}

{
   "Notification": {
      "subscriptionURI": "/subscriptions/2",
      "Events": [
         {
403 ─── "resourceURI": "/devices/1/alarm",
            "eventTime": "2013-07-03T12:10:00",
            "event": "Notified",
            "Alarm": {
               "code": "Motion",
               "description": "Door Alarm",
               "triggeredTime": "2013-10-15T19:00:00,
            }
         }
      ]
   }
}
```

401 INFORMATION INCLUDED PUSH MESSAGE

FIG.4

METHOD AND DEVICE FOR EVENT NOTIFICATION IN HOME NETWORK SYSTEM

CROSS-REFERENCE TO RELATED APPLICATION(S)

This application is a continuation application of prior application Ser. No. 15/105,323, filed on Jun. 16, 2016, which was a U.S. National Stage application under 35 U.S.C. § 371 of an International application filed on Dec. 19, 2014 and assigned application number PCT/KR2014/012584, which claimed the benefit of a Korean patent application filed on Dec. 20, 2013 in the Korean Intellectual Property Office and assigned Ser. No. 10-2013-0160535, the entire disclosure of each of which is hereby incorporated by reference.

TECHNICAL FIELD

The present invention relates to a method and an apparatus for notifying of an event in a home network system.

BACKGROUND ART

A home network system refers to a system that connects home devices installed in a house through a wired or wireless network so as to enable communication between the home devices. In the home network system, a change in particular information of home devices means generation of an event in the home device. The event of the home device may include, for example, a refrigerator door opening.

FIG. 1 illustrates a structure of a home network system for notifying of an event of a general home device.

When an event is generated in the home device (for example, refrigerator) in step 101 (or when particular information is changed in the home device), a mobile terminal 110 makes a request for subscription to be informed of the generation of the event to the home device 100 (that is, subscription process). Then, the home device 100 transmits an event notification including information related to the event (for example, door opening) to the mobile terminal 110 in step 103.

An application, which is not being used, is generally turned off in the mobile terminal (that is, the application is not being executed). Accordingly, when the application is not being executed, the mobile terminal 110 cannot receive the event notification even though the subscription process with the home device 110 has been performed.

DETAILED DESCRIPTION OF THE INVENTION

Technical Problem

The present invention provides a method and an apparatus for receiving an event notification although an application for receiving a notification message is not being executed.

The present invention provides a method and an apparatus for reducing a load of a push server.

Technical Solution

In accordance with a method according to an embodiment of the present invention, a method of receiving an event notification message of a home device by a mobile terminal in a home network system includes: receiving a push message including information on a home device, in which an event is generated, from a push server; executing an application of the mobile terminal; and receiving an event notification message from the home device.

In accordance with an apparatus according to an embodiment of the present invention, an apparatus for receiving an event notification message of a home device by a mobile terminal in a home network system includes a controller that receives a push message including information on a home device, in which an event is generated, from a push server, executes an application of the mobile terminal, and receives an event notification message from the home device.

In accordance with a method according to an embodiment of the present invention, a method of transmitting an event notification message of a home device by the home device in a home network system includes: detecting an event; transmitting an event message including information on a home device, in which an event is generated, to a push server; and transmitting an event notification message to a mobile terminal.

In accordance with an apparatus according to an embodiment of the present invention, an apparatus for transmitting an event notification message of a home device by the home device in a home network system includes a controller that detects an event, transmits an event message including information on a home device, in which an event is generated, to a push server and transmits an event notification message to a mobile terminal.

BRIEF DESCRIPTION OF THE DRAWINGS

FIG. 4 illustrates an example of a notification message according to the second embodiment of the present invention;

MODE FOR CARRYING OUT THE INVENTION

Figure 1:
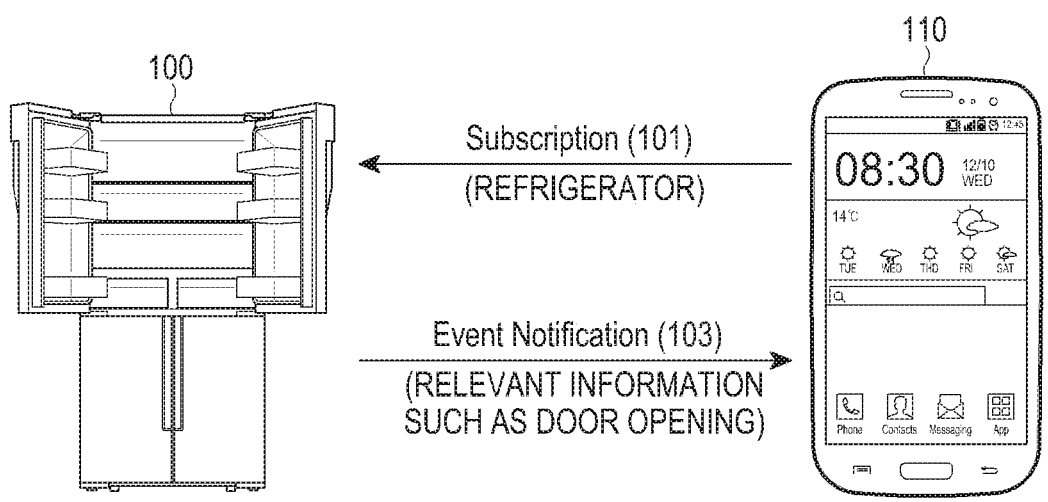
FIG. 1 illustrates a structure of a home network system for an event notification of a general home device.

Hereinafter, exemplary embodiments of the present invention will be described in detail with reference to the accompanying drawings. The same elements will be designated by the same reference numerals although they are shown in different drawings. Further, a detailed description of a known function and configuration which may make the subject matter of the present invention unclear will be omitted.

Further, terms or words used in the description and claims below should not be interpreted as only general or dictionary meanings, but interpreted as meanings and concepts satisfying the technical spirit of the present invention based on a principle in that the inventor can appropriately define his/her invention with a concept of the terms in order to describe the invention in the best method. An application described hereinafter may be, for example, a smart home application. Further, since application execution and application driving described hereinafter have the same meaning, they may be interchangeably used. In addition, since reception of an event notification and reception of an event notification message described hereinafter have the same meaning, they may be interchangeably used.

Figure 2:
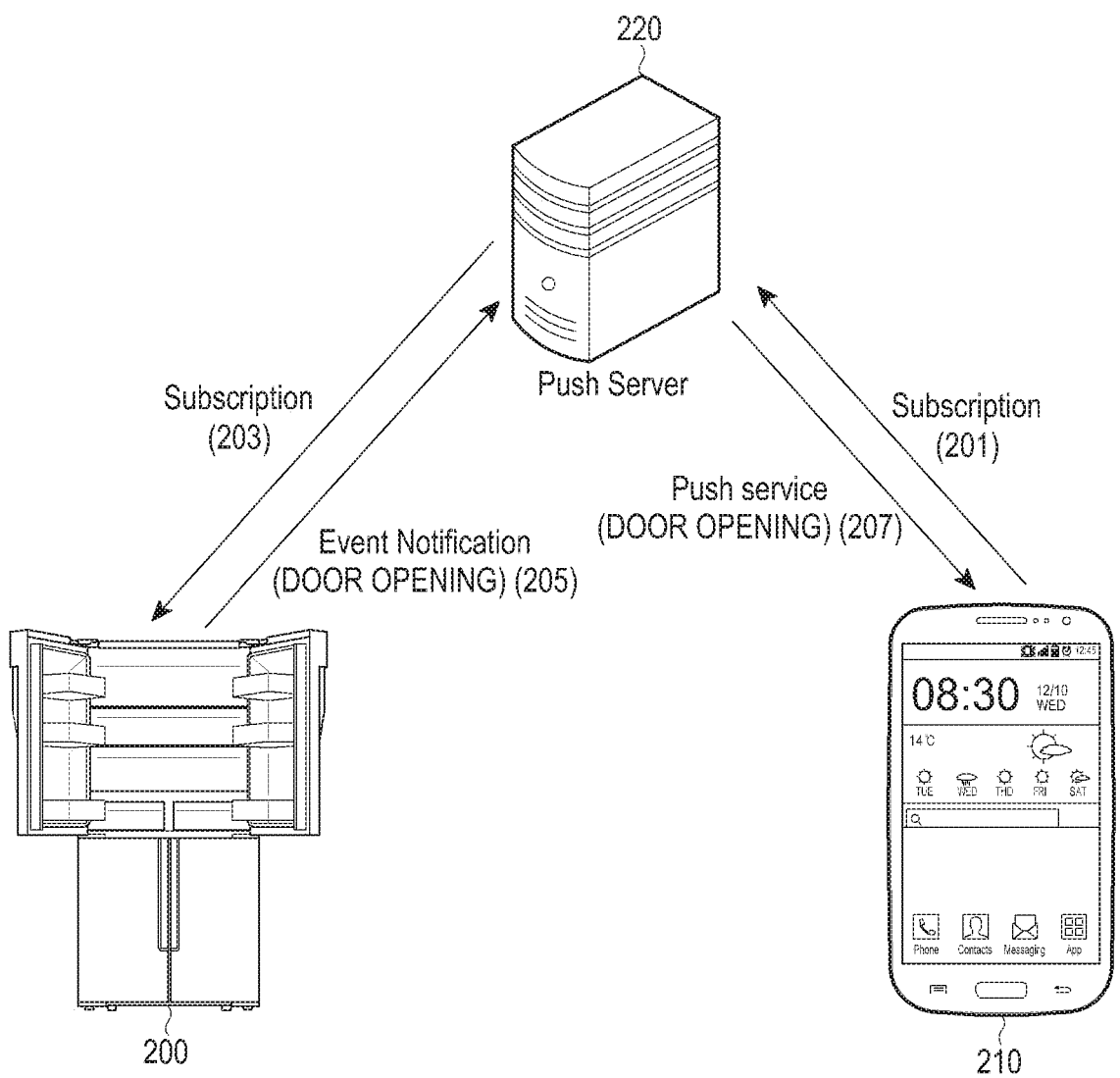
FIG. 2 illustrates a structure of a home network system for an event notification of a home device according to a first embodiment of the present invention.

FIG. 2 illustrates a structure of a home network system for an event notification of a home device according to a first embodiment of the present invention.

Referring to FIG. 2, the home network system includes a home device 200 having control and communication functions, a push server 220, and a mobile terminal 210.

Although FIG. 2 illustrates only one home device, the present invention can be applied to a case where a plurality of home devices exist. Hereinafter, a case where one home device exists will be described. The home device 200 is located inside (or outside) a house, and includes smart home appliances, security devices, lighting devices, energy devices, and the like. An event described in the present invention may be, for example, an event generated in the smart home appliance, the security device, the lighting device, the energy device, and the like. However, the event is not limited thereto. For example, the smart home appliance may be a smart TV, an Internet TV, a general TV, a refrigerator, a washing machine, a robot cleaner, and the like. For example, the security device may be a door lock, a security camera, a security sensor, and the like, the lighting device may be a Light Emitting Diode (LED) lighting device, and the like, and the energy device may be a power measurement device, a power socket, an electric outlet, a multi-outlet strip, and the like. Additionally, home devices may be, for example, a Personal Computer (PC), an IP camera, an Internet phone, a wired/wireless phone, a mobile phone within a house, and the like.

The home device 200 may be configured to communicate with the push server 220 according to a wired or wireless communication scheme, receive a control command from the push server 220, and transmit required information corresponding to the control command to the push server 220. At this time, the home device 200 may communicate with the push server 220 via a home gateway which is not illustrated in the drawing.

The push server 220 corresponds to a server that provides a push service (for example, Samsung Push Platform (SSP), Google Cloud Message (GCM), and the like) for receiving particular event information by using an Operating System (OS) and a message service of a system level even though a particular service application does not operate.

The push server 220 includes communication modules for communicating with the home device 200 according to a wired or wireless communication scheme. Further, the push server 220 may register information on the home device 200, control an operation and a state of the home device 200, collect required information from the home device 200, and manage the collected information. Particularly, the push server 220 may be connected to a data network, that is, an IP network such as the Internet to allow access of the mobile terminal 210 through the Internet and transfer a control signal received from the mobile terminal 210 to the corresponding home device 200. Further, when the push server 220 receives an event notification including information related to door opening from the home device 200, the push server 220 transmits a push service of informing the mobile terminal 207 having a subscription relation of the door opening. The event may be, for example, a refrigerator door opening, detection of trespassing by a security camera, and the like.

The mobile terminal 210 executes and installs an application which can communication with the push server. In addition, the mobile terminal 210 executes and installs an application which can communication with the home device. The application may be limited to be installed only in the mobile terminal 210 of the user who has passed through a predetermined authentication process.

The home network system configured as described above may provide a home entertainment service such as an Internet TV (IPTV), a smart TV, a Video on Demand (VoD) through the Internet, a home data communication service such as data sharing, an Internet call (for example, a Voice over IP (VoIP)), and a video call, and a home automation service such as a remote control of home appliances, remote meter reading, crime prevention, and disaster prevention. That is, the home network system connects and controls all types of home devices used inside/outside the house through one network.

Meanwhile, a user in the outside may remotely access each home device included in within the home network system by using wireless communication equipment such as the mobile terminal 210. The mobile terminal may be, for example, a Personal Digital Assistant (PDA) having a communication function, a smart phone, a mobile phone, a tablet computer, a notebook, and the like, and may access the home network system through a service provider network and the Internet.

Referring to FIG. 2, when an event is generated in the home devices (or particular information is changed), the mobile terminal 210 may make a request for subscription to be informed of the generation of the event to the home device 200 through the push server 220 in steps 201 and 203. The mobile terminal 210 which desires to receive an event notification is registered in the home device 200 in advance (that is, a registration process is performed before the main operation of the present invention is performed). Further, when particular information is changed, the mobile terminal which desires to receive particular information is registered in the push server 220 in advance. Then, the home device 200 transmits an event notification including information related to the event (for example, door opening or the like) to the push server 220 in step 205. Alternatively, the home device 200 transmits a message indicating that the particular information has been changed to the push server 220 in step 205. Then, the push server 220 provides a push service including the information related to the event to the mobile terminal 210 or provides a push service including the change in the particular information to the mobile terminal 210 in step 207. Accordingly, the mobile terminal 210 may recognize the generation of the event such as the door opening or the like in the home device 200.

Although the door opening is described as an example of the type of event in the first embodiment of the present invention, the type of event may include, for example, motion detection, sound detection, fire detection, gas detection, refrigerator event, an air conditioner (air con) event, a washer event, and the like.

The above described embodiment has a limitation in a message size which can be transmitted through the push service, and has a disadvantage in that it takes time to transmit a push message to the mobile terminal registered in the push server since the message size is big. Further, the above described embodiment has a disadvantage in that individual events of the home devices should be registered in the push server. An embodiment to compensate for the disadvantages is a second embodiment of the present invention described below.

Figure 3:
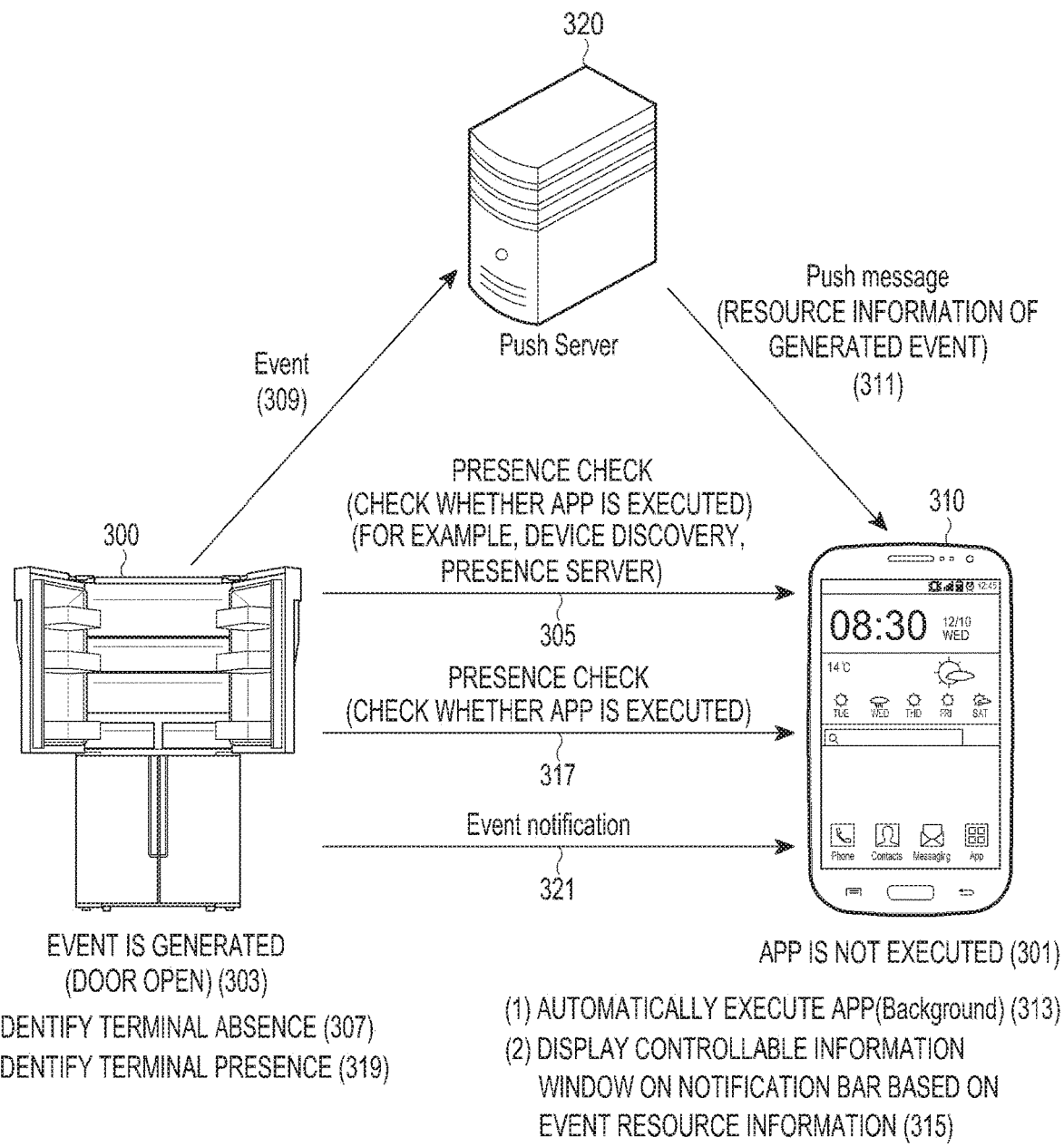
FIG. 3 illustrates a structure of a home network system for an event notification of a home device according to a second embodiment of the present invention.

FIG. 3 illustrates a structure of a home network system for an event notification of a home device according to the second embodiment of the present invention.

It is assumed that an event of a home device is directly registered in the home device in the second embodiment of the present invention.

Although not illustrated in FIG. 3, when an event is generated in the home devices, a mobile terminal 310 makes a request for subscription to be informed of the generation of the event to a home device 300 through a push server 320 (that is, subscription process). Further, when particular information is changed, the mobile terminal 310 which desires to receive the changed particular information registers in the push server 320. The subscription process means an operation in which the mobile terminal 310 which desires to receive an event notification is registered in the home device 300 in advance.

In step 301, it is assumed that an application is not executed in the mobile terminal 310. When particular information is changed in the home device (that is, when an event is generated) in step 303, the home device 300 identifies whether the application of the mobile terminal 310 is executed, by using, for example, a device discovery operation and a presence server in step 305. When it is determined that the application of the mobile terminal 310 is not being executed in step 307, the home device 300 informs the push server 320 of the generation of the event (for example, door opening or the like) through an event (or an event message or a push message) including resource information of the generated event in step 309. Since the event of step 309 has a limitation in a text length, the event cannot include all pieces of information included in an event notification of step 321 described below. Accordingly, the information included in the event of step 309 includes minimum information which the mobile terminal 310 should know among the information included in the event notification of step 321. The minimum information includes, for example, an event type, a home device URI, and the like. The push server 320 provides the push message including resource information of the generated event to the mobile terminal 310 in step 311. Accordingly, the mobile terminal 310 automatically executes the application in step 313. Further, the mobile terminal 310 displays an information window, which can be controlled based on the resource information of the generated event, on a notification bar of the mobile terminal 310 in step 315. The notification bar of the mobile terminal 310 will be described in detail with reference to FIG. 5 below.

The home device 300 checks whether the application of the mobile terminal 310 is executed in step 317. When it is identified that the application of the mobile terminal 310 is executed in step 319, the home device 300 directly transmits an event notification to the mobile terminal 310 in step 321. Accordingly, the mobile terminal 310 may recognize the generation of the event such as the door opening or the like in the home device.

According to an implementable embodiment, when it is determined that the application of the mobile terminal 310 is executed, the home device 300 may directly transmit the event notification to the mobile terminal 310 by a request from the mobile terminal 310 in step 321.

Although the door opening is described as an example of the type of event in the second embodiment of the present invention, the type of event may include, for example, motion detection, sound detection, fire detection, gas detection, refrigerator event, an air conditioner (air con) event, a washing machine (washer) event, and the like.

FIG. 4 illustrates an example of a notification message according to the second embodiment of the present invention.

Information included in the notification message includes information, which is not included in the push message, as well as information included in the push message as illustrated in FIG. 4.

The information included in the push message in step 311 of FIG. 3 corresponds to resource information of the home device having the generated event. In FIG. 4, information 401 included in the push message may be, for example, a resource Uniform Resource Identifier (URI) (or a URI) as indicated by reference numeral 403. When the URI included in the push message is received, the mobile terminal may know which home device has the generated event.

According to an optional embodiment, the information included in the push message may include an identifier indicating the type of event.

Table 1 below shows identifiers (that is, values in Table 1) corresponding to event types.

TABLE 1

| Event Type | Value |
| --- | --- |
| Motion detection | 01 |
| Sound detection | 02 |
| Fire detection | 03 |
| Gas detection | 04 |
| Refrigerator event | 05 |
| Aircon event | 06 |
| Washer event | 07 |
| Reserved | |

Referring to Table 1 above, for example, a motion detection may be configured as "01", a sound detection may be configured as "02", a fire detection may be configured as "03", a gas detection may be configured as "04", a refrigerator event may be configured as "05", an air conditioner (air con) event may be configured as "06", and a washer event may be configured as "07". When the indicator included in the push message is received, the mobile terminal may know the type of event generated in the home device.

According to an optional embodiment, the information included in the push message may be a time when the event is generated, an identification of the home device, state information of the home device, an alarm of the home device, an identification of the push server, and the like.

Figure 5:
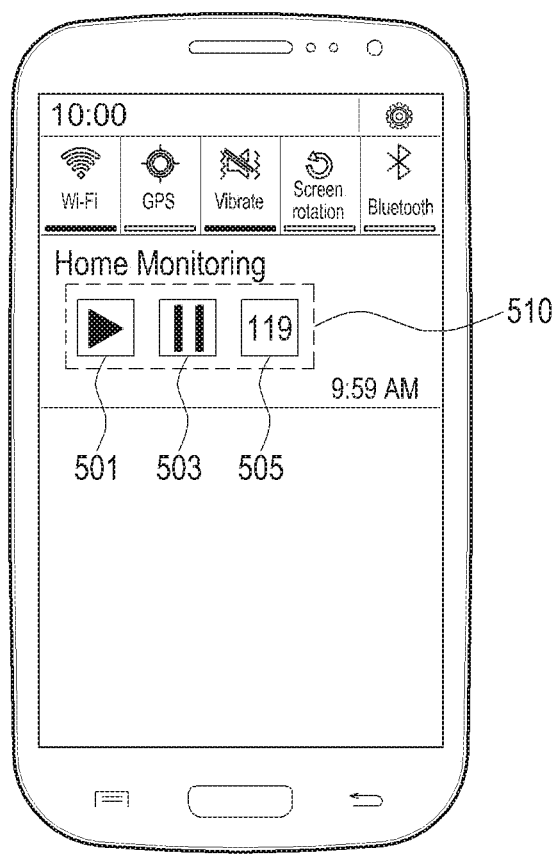
FIG. 5 illustrates an example of an event notification window of the mobile terminal according to an embodiment of the present invention.

FIG. 5 illustrates an example of an event notification window of the mobile terminal according to an embodiment of the present invention.

Before the event notification window of the mobile terminal of FIG. 5 is displayed, the mobile terminal may display concretely which event is generated and in which home device the event was generated.

When the mobile terminal automatically executes the application in step 313 of FIG. 3, a controllable information window is displayed on the notification bar of the mobile terminal based on resource information (that is, information on the home device in which the event is generated) of the generated event. FIG. 5 illustrates an example of a notification bar 510. The notification bar includes, for example, an execution icon 501, a pause icon 503, and a 119 icon 505.

The 119 icon 505 may be variously changed according to the event type. The form of the notification bar may be added/changed according to the type of event, the type of mobile terminal, characteristics of the mobile terminal, and the like.

The execution icon 501 is used when a control command for executing the operation of the home device is required. When a user gesture, for example, a touch is detected on the execution icon 501, the mobile terminal executes a home smart application.

The pause icon 503 is used when a control command for stopping the operation of the home device is required. When a user gesture, for example, a touch is detected on the pause icon 503, the mobile terminal stops the smart home application.

The 119 icon 505 is used when an event of the home device is not detected, that is, when a call to 119 is made. When a user gesture, for example, a touch is detected on the 119 icon 505, the mobile terminal calls 119.

Figure 6:
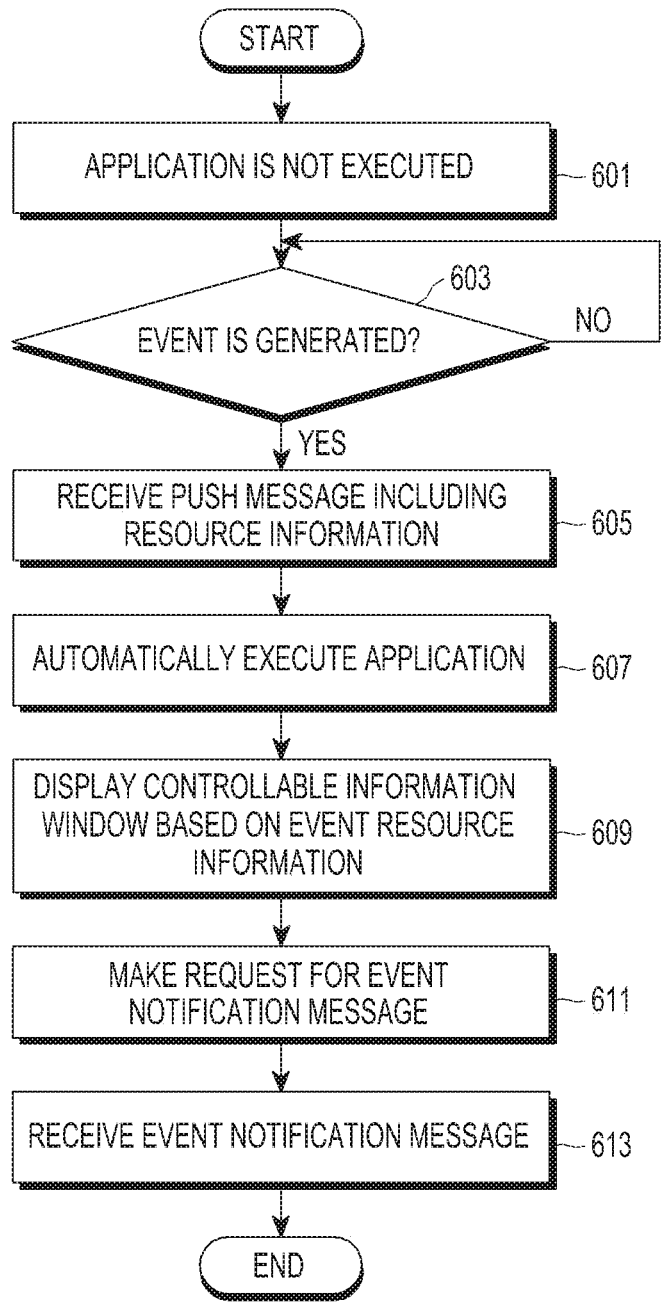
FIG. 6 is a flowchart illustrating an operation of the mobile terminal according to an embodiment of the present invention.

FIG. 6 is a flowchart illustrating the operation of the mobile terminal according to the second embodiment of the present invention.

It is assumed that an application is not executed in the mobile terminal in step 601. In step 603, the mobile terminal determines whether an event is generated in the home device. At this time, when the event is generated in the home device in step 603, the mobile terminal receives a push message including resource information from the push server in step 605. The resource information may include a URL and the like.

The mobile terminal automatically executes the application based on the resource information included in the push message in step 607. Further, the mobile terminal displays a controllable information window based on the resource information included in the push message in step 609. At this time, the mobile terminal may inform the home device that the application is being executed. According to an optional embodiment, the home device may identify whether the mobile terminal executes the application.

The mobile terminal may make a request for an event notification message to the home device in step 611. However, the operation of step 611 can be omitted.

The mobile terminal receives the event notification (or the event notification message) from the home device which has identified that the mobile terminal is executing the application in step 613. Alternatively, after making the request for the event notification message to the home device, the mobile terminal receives the event notification (or the event notification message) from the home device in step 613.

Figure 7:
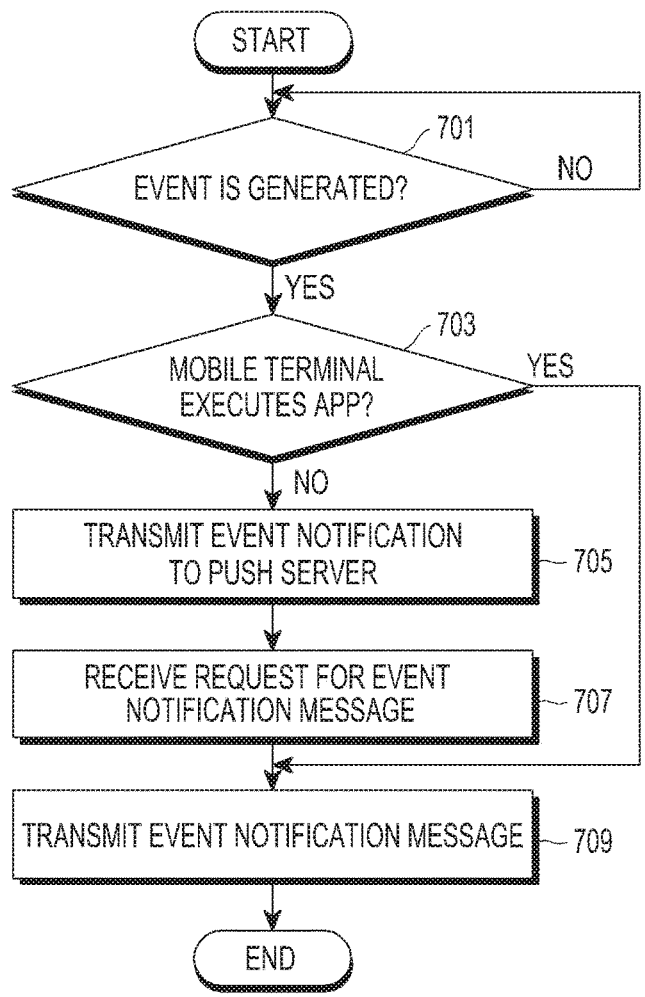
FIG. 7 is a flowchart illustrating an operation of the home device according to an embodiment of the present invention.

FIG. 7 is a flowchart illustrating the operation of the home device according to the second embodiment of the present invention.

The home device determines whether an event is generated in step 701. When it is determined that the event is generated, the home device determines whether the mobile terminal executes an application in step 703. The home device may determine whether the mobile terminal 310 executes the application by using a device discovery operation, a presence server, and the like. The home device may ask the mobile terminal about whether the application is executed in order to detect the application execution of the mobile terminal. Further, the home device may receive a notification of the application execution from the mobile terminal in order to detect the application execution of the mobile terminal.

When the mobile terminal is not executing the application, the home device transmits an event notification to the push serer in step 705. Thereafter, the home device receives a request for an event notification message from the mobile terminal which is executing the application in step 707. The operation of step 707 can be omitted. When the home device identifies that the mobile terminal is executing the application or receives the request for the event notification message from the mobile terminal, the home device transmits the event notification (or event notification message) to the mobile terminal in step 709. The event notification (or event notification message) of step 709 is the same as the notification message of FIG. 4.

Figure 8:
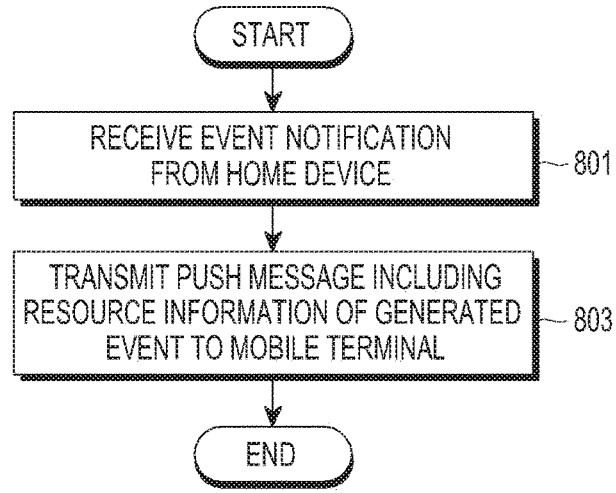
FIG. 8 is a flowchart illustrating an operation of the push server according to an embodiment of the present invention.

FIG. 8 is a flowchart illustrating the operation of the push server according to the second embodiment of the present invention.

The push server receives an event notification including information on the home device, in which the event is generated, from the home device in step 801. The push server converts the received event notification to a push message for providing a push service. The push server transmits the push message including resource information of the generated event (that is, information on the home device in which the event is generated) in step 803.

According to the present invention, the event notification can be received although the application is not being executed.

The present invention can reduce load of the push server. Further, according to the present invention, as the notification message is received through a separate push server, the mobile terminal can accurately receive the notification message.

In the home network system according to embodiments of the present invention, a configuration, storage, and management of the push message can be implemented in the form of hardware, software, or a combination of hardware and software. File data and/or the software can be stored, for example, in a volatile or non-volatile storage device such as a Read Only Memory (ROM), a memory such as a Random Access Memory (RAM), a memory chip, a memory device, or an integrated circuit, or an optical or magnetic recordable and machine (for example, computer)-readable storage medium such as a Compact Disk (CD), a Digital Versatile Disc (DVD), a magnetic disk, or a magnetic tape, regardless of its ability to be erased or its ability to be re-recorded.

Although the present invention has been described above, it is understood by those skilled in the art which the present invention pertains to that the present invention may be variously substituted, varied, and modified without departing from the technical spirit and scope of the present invention, and is not limited to the above-described embodiments and the accompanying drawings.

What is claimed is:

1. A method of receiving an event notification message of a home device by a mobile terminal in a home network system, the method comprising:
    transmitting, to a push server, information indicating an event that a notification is requested by the mobile terminal among a plurality of events in the home device;
    receiving a push message from the push server based on generation of the event on the home device, wherein the push message includes resource information on the home device in which the event is generated, and wherein the resource information is obtained by the push server, when an application of the mobile terminal is not executed;
    executing the application of the mobile terminal based on the receiving the push message;

transmitting, to the home device, first information indicating that the application is being executed; and
receiving a second information including the event notification message related to the event directly from the home device which identifies that the application is being executed in the mobile terminal.

2. The method of claim 1, further comprising displaying an icon that is controlled based on the second information related to the event from the home device, when the application of the mobile terminal is executed.

3. The method of claim 1,
wherein the push message includes at least part of information included in the event notification message, and
wherein the event notification message includes both the at least part of information included in the push message and other information which is not included in the push message.

4. An apparatus for receiving an event notification message of a home device by a mobile terminal in a home network system, the apparatus comprising:
a communication circuit; and
at least one processor configured to:
transmit, via the communication circuit, to a push server, information indicating an event that a notification is requested by the mobile terminal among a plurality of events in the home device,
receive a push message including resource information on the home device based on generation of the event on the home device, wherein the resource information is obtained by the push server, when an application of the mobile terminal is not executed,
execute the application of the mobile terminal based on receiving the push message,
transmit, to the home device, first information indicating that the application is being executed, and
receive a second information including the event notification message related to the event directly from the home device which identifies that the application is being executed in the mobile terminal.

5. The apparatus of claim 4, further comprising displaying an icon that is controlled based on the second information related to the event from the home device, when the application of the mobile terminal is executed.

6. The apparatus of claim 4,
wherein the push message includes at least part of information included in the event notification message, and
wherein the event notification message includes both the at least part of information included in the push message and other information which is not included in the push message.

7. A method transmitting an event notification message of a home device by the home device in a home network system, the method comprising:
detecting an event;
transmitting, through a push server, a push message including resource information of a generated event, to mobile terminal, when an application of the mobile terminal is not executed, wherein the resource information of the generated event is provided to the mobile terminal to execute the application;
receiving, from the mobile terminal, a first information indicating that the application is being executed; and
after identifying, based on the first information, that the application is being executed, transmitting a second information including the event notification message related to the generated event directly to the mobile terminal.

8. The method of claim 7, wherein the resource information on the home device, in which the event is generated, includes a uniform resource identifier (URI) of the home device.

9. The method of claim 7, wherein the resource information on the home device, in which the event is generated, includes an identifier indicating a type of the event of the home device.

10. An apparatus for transmitting an event notification message of a home device by the home device in a home network system, the apparatus comprising:
a communication circuit; and
at least one processor configured to:
detect an event,
transmit, through a push server, a push message including resource information of a generated event, to mobile terminal, when an application of the mobile terminal is not executed, wherein the resource information of the generated event is provided to the mobile terminal to execute the application,
receive, from the mobile terminal, a first information indicating that the application is being executed, and
after identifying, based on the first information, that the application is being executed, transmit a second information including the event notification message related to the generated event directly to the mobile terminal.

11. The apparatus of claim 10, wherein the resource information on the home device, in which the event is generated, includes a uniform resource identifier (URI) of the home device.

12. The apparatus of claim 10, wherein the resource information on the home device, in which the event is generated, includes an identifier indicating a type of the event of the home device.

13. A method of receiving an event notification message in a home network system, the method comprising:
receiving, from a mobile terminal, an event that a notification is requested among events in a home device;
receiving an event message including resource information of the event on the home device, from the home device;
converting the event message into a push message including the resource information of the event, wherein the resource information is obtained by a push server, when an application of a mobile terminal is not executed; and
transmitting the push message to the mobile terminal to cause the mobile terminal to execute the application;
executing, by the mobile terminal, the application of the mobile terminal based on receiving the push message;
transmitting, by the mobile terminal, to the home device, first information indicating that the application is being executed; and
receiving by the mobile terminal, second information including the event notification message related to the event directly from the home device which identifies that the application is being executed in the mobile terminal.

14. A system for receiving an event notification message in a home network system, the system comprising:
a push server comprising:
a first receiver,
a first transmitter, and
a first processor,
wherein the first processor is configured to:
receive, through first receiver, an event that a notification is requested among events in a home device, receive, through the first receiver, an event message including resource information based on generation of the event on the home device, from the home device, convert the event message into a push message including the resource information of the event, wherein the resource information is obtained by the push server, when an application of a mobile terminal is not executed, and transmit, through the first transmitter, the push message to the mobile terminal to execute the application, and the mobile terminal comprising:
 a second transmitter,
 a second receiver, and
 a second processor,
wherein the second processor is configured to:
 execute the application of the mobile terminal based on receiving the push message,
 transmit, through the second transmitter, to the home device, first information indicating that the application is being executed, and
 receive, through the second receiver, second information including the event notification message related to the event directly from the home device which identifies that the application is being executed in the mobile terminal.

15. The system of claim 14, wherein the push message includes at least part of information included in the event notification message, and wherein the event notification message includes both the at least part of information included in the push message and other information which is not included in the push message.

\* \* \* \* \*